[11] 3,554,105

[72] Inventor  Neal R. Dougherty
              Bellbrook, Ohio
[21] Appl. No. 696,398
[22] Filed     Jan. 8, 1968
[45] Patented  Jan. 12, 1971
[73] Assignee  The Mead Corporation
               Dayton, Ohio
               a corporation of Ohio. by mesne
               assignments

[54] METHOD AND APPARATUS FOR ORIENTING A POLARIZING FILTER
9 Claims, 5 Drawing Figs.

[52] U.S. Cl. ........................................ 95/12.5,
                                                   350/156
[51] Int. Cl. ..................................... G03b 11/00
[50] Field of Search ........................... 95/12, 5;
                                                  350/156

[56]            References Cited
           UNITED STATES PATENTS
2,018,963  10/1935  Land .......................... 350/156X
2,399,431   4/1946  Gazda ......................... 350/156X

*Primary Examiner*—John M. Horan
*Attorney*—Marechal, Biebel, French & Bugg

ABSTRACT: A system for use with a camera or other optical device, to obtain optimum filtering of light polarized by atmospheric scattering or by specular reflections, includes a polarimeter which supplies an electrical signal representing the polarization plane angle of the light scattered by the atmosphere to control the orientation of a polarizing filter positioned before the optical device. Both the method of orienting the polarizing filter and an apparatus to perform this method include the use of photoelectric transducers to produce electrical signals representing both the actual polarization plane angle of the scattered light and the phase relationship of the polarization axis of the polarizing filter with respect to the polarization plane angle. The output of the polarimeter is also used to control the exposure of the film in a camera.

PATENTED JAN 12 1971　　　3,554,105

INVENTOR
NEAL R. DOUGHERTY
BY
Marechal, Biebel, French & Bugg
ATTORNEYS

METHOD AND APPARATUS FOR ORIENTING A POLARIZING FILTER

BACKGROUND OF THE INVENTION

One of the major problems encountered in aerial photography is excessive blue haze in the atmosphere which tends to obscure the image being observed. This blue haze may be partially eliminated by using a haze filter which reduces the amount of blue light transmitted therethrough, but this approach has the disadvantage of also reducing the image-forming blue light from the object. It has been found that under some conditions, a polarizing filter, properly oriented, will reduce the atmospheric blue haze observed without reducing or eliminating the blue light which is naturally emitted or reflected by the object.

The blue haze of the atmosphere is chiefly a result of molecular scattering of the light emitted by the sun. This molecular scattering, as predicted in the Rayleigh theory, is polarized with the E vector of the light perpendicular to the plane of observation. The amount or magnitude of polarization P depends on the scatter angle $\theta$ according to the following formula $$P = \frac{\sin^2\theta}{1+\cos^2\theta}$$

Thus, the scattered light is completely polarized when $\theta$ equals 90° and completely unpolarized when $\theta$ equals 0° or 180°.

In addition to the blue haze, or Rayleigh scatter, another light scattering effect is produced due to the interaction of the light with aerosol particles in the atmosphere, and this scattering characteristic is predicted by the Mies theory, which states that the polarization from aerosol scatter is a complex function of the optical constants of the material in the atmosphere and depends upon the ratio of droplet size to wavelength and the scatter angle. The polarization of aerosol scattered radiation, however, is reduced by multiple scattering where the previously scattered light is acted on further by other aerosol particles. In the atmosphere, the scattered radiation produced by aerosol particles is not highly polarized and is spectrally flat when compared to the predominantly blue haze produced by molecular scattering. This is because the aerosol particles are statistically distributed in both space and size. The polarization angle, however, is the same for both molecular and aerosol scattered light. Both the Rayleigh and Mies scatter theories are discussed in "Principles of Optics," Third Edition, by Born & Wolf, Chapter 13.

Polarized light may also be generated by specular reflections which occur when light is reflected from a medium having a dielectric coefficient different from the dielectric coefficient of air.

Therefore, under those conditions where polarized light is present which decreases the contrast of an object being observed, a polarizing filter placed in front of the eye or camera will improve the image if that filter is properly oriented, since the ratio of the image forming light to the polarized light is increased as the amount of polarized light is decreased.

BRIEF DESCRIPTION OF THE INVENTION

This invention relates to a method and apparatus for orienting a polarizing filter placed before an optical device, such as a camera or the human eye, and includes a polarimeter to sense the polarization plane angle of the polarized light from atmospheric scatter or specular reflections so that the polarizing filter may be properly oriented to minimize the amount of polarized light transmitted therethrough and thereby enhance the contrast of the image.

The polarimeter used in the preferred embodiment of this invention includes another polarizing filter rotatably positioned between the object and a photoelectric transducer. A first electrical signal is produced by the transducer which has a variable component representing the polarization of the light coming from the area being observed. Polarization is a quantity having both magnitude and direction or angle. When observing objects where the scatter angle is in the order of 90°, or where the light strikes the atmosphere at right angles to the axis of the camera, the magnitude of the polarization will be at its greatest level and the angle of the polarization plane will be perpendicular to the plane of observation, which is defined as being formed by the camera axis and the source of light, usually the sun. It is under these conditions that the method and apparatus of this invention are most useful in obtaining images of high contrast. When the polarization has a low magnitude, only slight improvement in the contrast of the image may result.

The polarizing filter placed in front of the camera or the eye of an observer has attached or associated therewith means to produce a second electrical signal which, when compared with the first electrical signal from the polarimeter, represents the phase relationship between the polarization axis of the filter and the polarization plane angle of the light coming from the area being photographed or observed. These two electrical signals may be supplied to an electrical comparator circuit, which applies the appropriate signal to a motor and gear arrangement to orient the polarizing filter to minimize the amount of polarized light which passes therethrough. This orientation function may also be accomplished manually by presenting the first and second electrical signals simultaneously as separate traces on an oscilloscope and manually rotating the camera filter while observing these traces to adjust the phase relationship of the second electrical signal with respect to the first electrical signal.

In the preferred embodiment of the invention, a first polarizing filter is rotatably mounted between a camera and the object to be photographed, and a second polarizing filter is mounted for rotation adjacent thereto. A polarimeter including a first photoelectric transducer is mounted behind the second polarizing filter to produce a first electrical signal having a variable component representing the polarization of the light transmitted through the filter. The second polarizing filter is also positioned so that a portion thereof optically overlies the first polarizing filter, and a second photoelectric transducer is positioned to receive the light transmitted through the first and second polarizing filters to produce a second electrical signal representing the difference between the orientation of the polarization axis of the first polarizing filter with respect to the polarization axis of the rotating second polarizing filter.

When these two electrical signals are displayed on a cathode ray tube simultaneously, both will appear to have an approximately sinusoidal wave form, depending on the transducer response. The phase relationship between the first and second electrical signals may be adjusted by rotating the first polarizing filter. Minimum transmission of polarized light through the first polarizing filter occurs when the first and second electrical signals are 180° out of phase or when the polarization axis of the first polarizing filter is oriented 90° to the polarization plane angle of the incoming light, while maximum transmission of polarized light occurs when the two electrical signals are in phase.

Aerial photographs may be improved therefore by reducing the haze which results from the molecular and aerosol scattering of light and the polarization light resulting from specular reflections by properly orientating a polarizing filter and increasing the contrast between an object and the background. The invention may also be employed for use in ground oriented camera systems where ballistic photography or daylight astronomical photography is employed.

The polarimeter will sense the greatest source of polarized light whether from specular reflections or atmospheric scatter. Thus, for oblique photography from a low flying vehicle, the camera polarizing filter will be automatically set to reduce specular reflections from dielectric surfaces such as water. At high altitudes, the predominant source of polarized light will often be atmospheric scatter and the camera polarizing filter will then be oriented to minimize this haze.

However, there are cases when major contributions of polarized light can be made from both atmospheric scatter and specular reflections. When the camera is pointed outside the plane formed by the sun and the vertical, the polarization from these two sources is not in the same direction. In this case, the polarimeter will orientate the camera polarizing filter perpendicular to the net polarization sensed, and the result will be superior to the case where no polarizing filter is employed in every situation where a significant amount of net polarization exists.

Another application is to the human visibility problem where pilots and astronauts are required to look through the atmosphere. An automatically oriented polarizing filter can be fitted to a pilot's helmet or to the cockpit windows to improve the pilot's visibility. This technique is especially helpful in high altitudes since there the haze is caused mainly by the molecular scatter as predicted by the Rayleigh theory.

This invention can also be extended to improve the image obtained from electro-optical devices such as ultraviolet, visible and infrared scanners. Furthermore, underwater photography may also be improved when the camera is pointed in certain directions, since similar principles of light scatter and polarization thereof also apply in a water environment.

This invention also includes an automatic exposure control sensor which views the same scene through the polarimeter which is oriented in exactly the same direction as the main camera polarizing filter. This provides the proper exposure of the film even though the light is attenuated by various amounts, depending upon the orientation of the polarizing filter and the magnitude of the polarized light.

Accordingly, it is an object of this invention to improve the quality of aerial photography by reducing the haze which results from molecular and aerosol scattering of light as well as the polarized light resulting from specular reflections by properly orienting a polarizing filter located between the camera and the object, thereby increasing the contrast between the object and the background; to provide a method for orienting the polarizing filter by generating an electrical signal representing the polarization plane angle of the scattered light and orienting a polarizing filter in response to that signal to minimize the transmission of polarized light through that filter; to provide an apparatus for automatically positioning a polarizing filter in response to the polarization plane angle of the scattered light by comparing the electrical signal representing the polarization plane angle of the light with another signal representing the orientation of the filter with respect to that polarization plane angle to produce an error signal which is utilized to rotate the filter to the proper position and thereby to minimize the transmission of polarized light therethrough; and to provide an apparatus where the exposure of the film in a camera is adjusted automatically in response to the polarimeter output signal.

DESCRIPTION OF THE PREFERRED EMBODIMENT

Figure 1:
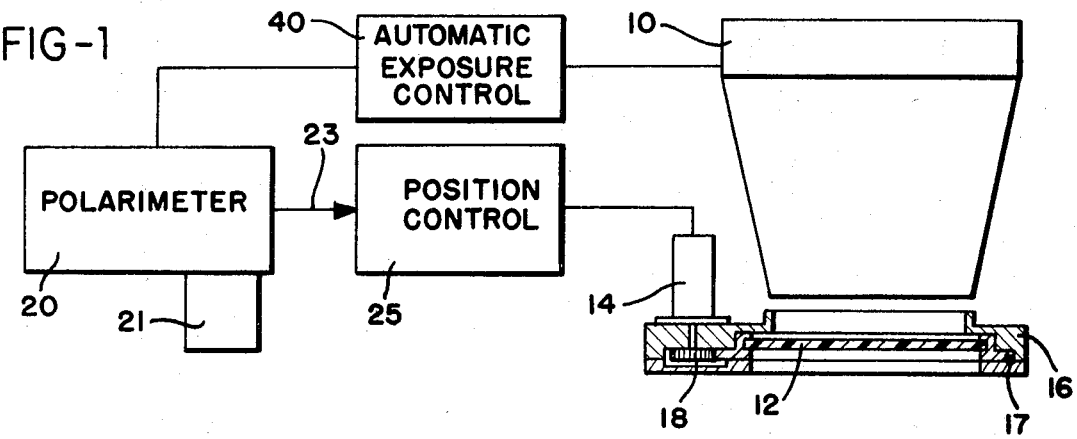
FIG. 1 is a generalized block diagram showing the various basic components which comprise this invention.
Figure 4:
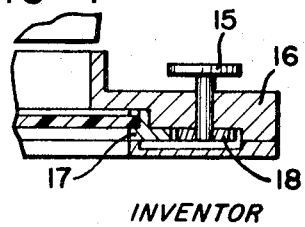
FIG. 4 is a view showing manual means for rotating the camera polarizing filter.

Referring now to FIG. 1, a camera 10 is positioned to view a scene through a polarizing filter 12. While a photographic camera is shown, it is to be understood that any optical device may be used with this invention, such optical devices including but not being limited to ultraviolet, visible, and infrared scanners, or the human eye. The axis of polarization of the filter 12 may be adjusted by a drive motor 14, or it may be manually positioned by the camera operator by suitable means, such as the knurled knob shown in FIG. 4.

In the embodiment of the invention shown herein, the polarizing filter 12 is mounted in a frame 16 and is provided with a gear 17 which extends completely around its circumference. A mating gear 18 is attached to the drive motor 14 and thus is able to rotate the polarizing filter and vary its polarization axis with respect to the incoming light.

A polarimeter 20 monitors the incoming light in the same field of view observed by the camera 10 and produces an electrical signal representing the polarization plane angle of the polarized portion of the incoming light. While the polarimeter may take many forms, the preferred embodiment of this invention incorporates a rotating polarizing filter positioned between the incoming light and a photoelectric transducer, and thus the electrical signal produced by the transducer has a variable magnitude representing the polarization of the light; that is, the peak to peak value of the variation in voltage represents the magnitude of the polarized light, and the phase angle of that signal with respect to a reference indicates the polarization plane angle. Therefore, the polarimeter 20 generally includes a light receiving element 21 and appropriate transducers to convert the incoming polarized light into an electrical signal which appears on line 23 and which is supplied to a comparator circuit 25. The comparator 25 is also provided with information regarding the polarization axis of the polarizing filter 12.

The comparator 25 may take many forms, as for example, a dual trace oscilloscope wherein the polarization plane angle of the incoming light may be compared visually to the polarization axis of the polarizing filter 12, and which permits the camera operator to adjust the filter 12 manually to minimize the amount of polarizing light transmitted to the camera and thus to enhance contrast of the object being photographed or observed. The comparator 25 may also be an electronic circuit which automatically compares the output from the polarimeter with a signal representing the polarization axis of the polarizing filter 12 to generate an output signal and to position that filter to the proper angle to minimize transmission of the polarized light.

Figure 2:
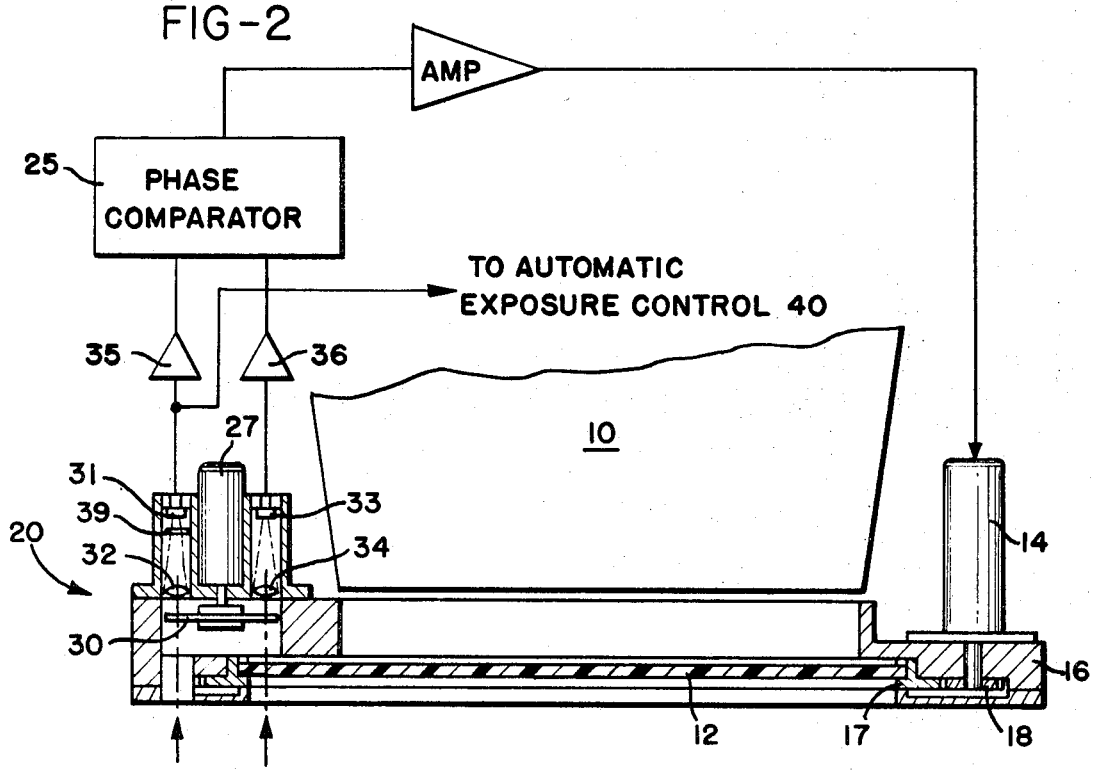
FIG. 2 is an elevational view of a preferred embodiment of a polarimeter and camera assembly with the electrical interconnection between these two elements shown in block diagram form.

In FIG. 2, the preferred embodiment of the invention includes a camera 10, a polarizing filter 12 rotatably mounted in front of the lens of the camera, and a drive motor 14 in driving engagement with the polarizing filter to rotate the filter to the proper polarization angle to reduce the transmission of polarized light. In this embodiment, the drive motor 14 is a reversible DC motor, although it is to be understood that other forms of motors may be used without departing from the scope of this invention.

Mounted on the frame 16 is a polarimeter 20 including a motor 27 which rotates a second polarizing filter 30. A photoelectric transducer 31 is positioned behind this second filter and produces a first electrical signal having a variable magnitude representing the polarization of the source of light transmitted through the rotating polarizing filter 30. A lens 32 may be provided to focus the incoming light onto the photoelectric transducer.

The second polarizing filter 30 is so positioned that a portion overlies the first polarizing filter 12. A second photoelectric transducer 33 is mounted behind the rotating filter 30 and is positioned to receive only that light which passes through both the first polarizing filter 12 and the second polarizing filter 30. Since much of the light passing through both these filters is unpolarized, the photoelectric transducer 33 will provide a cyclically varying signal representing the orientation of the first polarizing filter with respect to the second polarizing filter. A lens 34 may be employed to focus the light onto the transducer 33.

Connected to photoelectric transducers 31 and 33 are amplifiers 35 and 36, respectively, and the outputs from these amplifiers are applied to the phase comparator 25. These amplifiers are adjusted to equalize the magnitude of the outputs from the photoelectric transducers, since the variation in light intensity sensed by the photoelectric transducer 33 is greater than the variation in light intensity sensed by the photoelectric transducer 31, and the amount of polarized light viewed at even the most favorable scatter angle is only a fraction of the total light received.

Figure 3A:
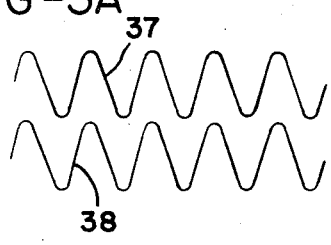
FIG. 3a is a view showing the waveform of the electrical output from the two photocells shown in FIG. 2 when the axis of the camera polarizing filter is oriented at the same angle as the polarization plane angle of the light.
Figure 3B:
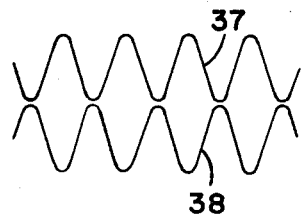
FIG. 3b is a view showing the waveform of the electrical output from the two photocells shown in FIG. 2 where the axis of the camera polarizing filter is oriented 90° to the polarization plane angle of the light.

FIGS. 3a and 3b are graphic representations of the outputs from amplifiers 35 and 36 where trace 37 represents the first electrical signal identifying the polarization plane angle of the scattered light and trace 38 represents the orientation of the filter 12 with respect to the angle of the polarization plane of the scattered light. In FIG. 3a, the polarizing filter 12 is aligned to permit maximum transmission of the polarized light, while in FIG. 3b, the polarizing filter 12 is oriented with its polarization axis at right angles to the polarized light and thus represents the condition where minimum blue haze is observed.

An operator may visually observe these traces on a dual trace oscilloscope and may adjust the polarizing filter 12 manually with reference solely to these traces and thus minimize the transmission of polarized light through the filter 12. Whenever a change in the polarization angle occurs, such as during the turn of an aircraft from one heading to another, the phase relationship between these two signals will change.

An electronic phase comparator 25 may be employed to provide an appropriate signal to the reversible motor 14, and whenever the polarization plane angle changes, the motor 14 will reposition the filter 12 to the proper polarization angle to minimize the specular reflections or the haze observed.

For some uses of the polarimeter 20, shown in FIG. 2, it may be desirable to place a blue filter 39 in front of the polarimeter transducer 31 to improve the signal to noise ratio or to increase the magnitude of the variable component in the light being observed compared to the total light value. This increases the modulation of the first electrical signal since the polarized light resulting from Rayleigh scattering occurs principally in the blue region of the spectrum.

With the polarizing filter properly oriented to minimize the amount of polarized light transmitted to the camera, the magnitude of the light at the camera will be at its lowest value. Positioning the polarizing filter at any other angle will increase the light transmitted to the camera, however, the magnitude of this light is less than the magnitude of the light measured at a point outside the polarizing filter. Therefore, to obtain correct exposures of photographic film in the camera, a light sensing device may be placed behind the polarizing filter or a part of the polarimeter output may be utilized as an indication of the light transmitted to the camera. It is not enough merely to measure the light received in an area adjacent the camera and to compensate by a fixed filter factor since the orientation of the filter and the magnitude of the polarization will affect the amount of light transmitted to the film.

In the preferred embodiment of this invention, the first electrical signal from the polarimeter is utilized as a measure of the light value and is used to control either the aperture or the shutter speed of the camera 10. The first electrical signal from the polarimeter 20 is chosen since the lowest magnitude of this signal is a measure of the average illuminance at the film plane. While the photoelectric transducer 31 is not observing the area being photographed through the same filter as the camera 10, it may be assumed that the polarizing filter 30 attenuates the light to the same degree as the camera polarizing filter 12 or the difference in light transmitting characteristics is a constant ratio.

Alternatively, the maximum signal from the transducer 33 may be utilized as a measure of the light transmitted to the camera. Since this transducer receives the light transmitted through both the camera polarizing filter 12 and the polarimeter filter 30, a correction must be made for the additional attenuation resulting from the filter 30. However, this attenuation is fixed and may be corrected by calibration.

In the preferred embodiment the output from transducer 31 is applied to an automatic exposure control device 40 which senses the minimum value of the first electrical signal and applies a signal to the camera 10 to adjust either the aperture or the shutter speed to provide the correct exposure for the film.

While the method and forms of apparatus herein described constitutes preferred embodiments of the invention, it is to be understood that the invention is not limited to this precise method and form of apparatus, and that changes may be made therein without departing from the scope of the invention which is defined in the appended claims.

I claim:

1. Apparatus for use with an optical device for observing an object through a medium containing polarized light tending to decrease the contrast of an image, comprising:
   means for producing a first electrical signal representing the polarization plane angle of the polarized light;
   a first polarizing filter positioned between said optical device and the medium such that all light within the field of view of said optical device pass through said first polarizing filter;
   means for producing a second electrical signal, which when compared to said first electrical signal, represents the orientation of the polarization axis of said first polarizing filter with respect to the polarization plane angle; and
   means operable to orient said first polarizing filter with its polarization axis at right angles to the polarization plane angle so that the amount of polarized light transmitted through said first polarizing filter is minimized and the contrast of the object is improved.

2. The apparatus as defined in claim 1 wherein said means operable to orient said first polarizing filter includes a manually operated means connected to said first polarizing filter.

3. The apparatus as defined in claim 1 wherein said means operable to orient said first filter includes an electronic comparator circuit to sense said first and second electrical signals, and a motor responsive to said comparator circuit to rotate said first polarizing filter.

4. The apparatus of claim 1 wherein said means for producing said first electrical signal representing the polarization plane angle of said polarized light includes:
   a photoelectric transducer for producing an electrical signal having a magnitude representing the intensity of the light applied thereto;
   a second polarizing filter mounted between said photoelectric means and the source of polarized light; and
   means cyclically changing the polarization axis of said second polarizing filter in front of said photoelectric transducer for producing said first electrical signal of variable magnitude representing the polarization plane angle.

5. The apparatus of claim 4 wherein said means for producing said second signal representing the polarization axis of said first polarizing filter includes said second polarizing filter mounted with a portion thereof optically overlying said first polarizing filter; and a second photoelectric transducer positioned to receive that light transmitted through both said first polarizing filter and said second polarizing filter for producing said second electrical signal representing the orientation of the polarization axis of said first polarizing filter with respect to said second polarizing filter.

6. The apparatus of claim 4 further comprising a blue filter positioned between said photoelectric transducer and the source of polarized light to increase the magnitude of the variable component of the light being observed due to polarization as compared to the average light value.

7. The apparatus as defined in claim 1 wherein said optical device is a photographic camera containing film and wherein the light transmitted to said camera is a function of the orientation of said first polarizing filter;

wherein the minimum value of said first electrical signal represents the amount of light transmitted through said first polarizing filter to said camera; and wherein said apparatus further includes means sensing said minimum value of said first electrical signal for controlling the exposure of the film in said camera.

8. A method for orienting a polarizing filter to increase the contrast of an image by an optical device of an object observed through a transparent medium wherein a portion of the observed light is polarized by said medium including the steps of:

placing a first polarizing filter between said optical device and the medium such that all light within the field of view of said optical devices passes through said first polarizing filter;

rotating a second polarizing filter between said medium and a light sensing electrical transducer having a similar field of view;

determining the polarization plane angle of said polarized light by sensing the electrical phase of the output of said sensing transducer representing the magnitude of the light intensity passing through said second filter; and orienting said first polarizing filter in response to the output of said sensing transducer so that its polarization axis is at right angles to said polarization plane angle to minimize the transmission of polarized light to said optical device and to improve the contrast of said image.

9. The method of claim 8 further including the steps of:

rotating said second polarizing filter with a portion thereof in overlapping relation with said first polarizing filter;

determining the polarization axis of said first polarizing filter by sensing the intensity of the light passing through both said polarizing filters; and orienting said first polarizing filter at right angles to said polarization plane angle.